United States Patent [19]

Suzuki

[11] Patent Number: 4,797,851
[45] Date of Patent: Jan. 10, 1989

[54] DATA TRANSFER CONTROL EQUIPMENT

[75] Inventor: Yoshito Suzuki, Kodaira, Japan

[73] Assignee: Hitachi, Ltd., Tokyo, Japan

[21] Appl. No.: 812,926

[22] Filed: Dec. 23, 1985

[30] Foreign Application Priority Data

Dec. 24, 1984 [JP] Japan .................. 59-270813

[51] Int. Cl.⁴ .................................. G06F 12/00
[52] U.S. Cl. ............................ 364/900; 360/49
[58] Field of Search ... 364/200 MS File, 900 MS File; 360/49

[56] References Cited

U.S. PATENT DOCUMENTS

| 4,204,250 | 5/1980 | Getson, Jr. et al. | 364/200 |
| 4,325,119 | 4/1982 | Grandmaison et al. | 362/200 |
| 4,325,120 | 4/1982 | Colley et al. | 364/200 |
| 4,521,871 | 6/1985 | Galdun et al. | 364/900 |
| 4,584,617 | 4/1986 | Libove et al. | 360/49 |
| 4,597,041 | 6/1986 | Guyer et al. | 364/200 |
| 4,654,791 | 3/1987 | Ushiro | 364/200 |

OTHER PUBLICATIONS

"Nikkei Electronics", Aug. 2, 1982, No. 296, 129 to 158, Nikkei, McGraw Hill Inc.

Primary Examiner—Emanuel S. Kemeny
Assistant Examiner—Randy Lacasse
Attorney, Agent, or Firm—Antonelli, Terry & Wands

[57] ABSTRACT

A Direct Memory Access Controller includes first and second registers respectively to which first and the second offset data are supplied, as well as a register to which source address data is supplied and a register to which destination address data is supplied. Every time one data item is transferred from one memory to the other, the source address data and the destination address data are updated respectively by values designated by the first offset data and the second offset data. Address data can be updated both increasingly and decreasingly. According to the Direcet Memory Access Controller of this construction, the transfer of data such as a rotational operation of graphic data stored within the image memory can be achieved without increasing the burden imposed upon the microprocessor.

17 Claims, 8 Drawing Sheets

DATA TRANSFER CONTROL EQUIPMENT

BACKGROUND OF THE INVENTION

The present invention relates to a data processing technique, and more specifically to a technique particularly useful for transferring data between devices in a microcomputer system, e.g. a technique which is applied in a DMA controller for controlling the data transfer effected according to a DMA (direct memory access) system.

Along with a microprocessor, there is an LSI called a DMA controller as an LSI (large scale integrated circuit) comprising a microcomputer system. Instead of the microprocessor, this DMA controller serves as an LSI for controlling data transfer when the transfer of massive amounts of data is needed between data input/output units such as a high speed CRT terminal, a hard disc or a floppy disc and memory or between memories. As compared with data transfer effected by a software-aided microprocessor, the DMA controller has advantages that not only the speed of data transfer is increased but the data throughput throughout the whole system is improved as well due to concurrent processing.

As a DMA controller as mentioned above, there is also proposed a high grade DMA controller which can not only transfer data comprising a maximum word length of 32 bits in accordance with several modes but which also incorporates a variety of exceptional processing functions such as recovering bus errors and interrupts as well as an error detecting function. (See, for example, "Nikkei Electronics", Aug. 2, 1982, No. 296, 129 to 158, Nikkei McGRAW Hill Inc.).

However, in a data transfer operation by a conventional DM controller, source addresses and destination addresses are each updated separately, one after another in succession, which therefore makes it impossible to store each item of data alternately since a series of groups of data are stored in succession within a given address space.

SUMMARY OF THE INVENTION

The object of the present invention is to achieve a novel data transfer system which is different from the prior art.

Another object of the invention is to provide such a data transfer system as can improve the data throughput throughout the system by relieving the burden imposed upon the microprocessor.

The above-mentioned and other objects and novel features of the invention will be understood from the description of the specification and accompanying drawings.

An outline of the typical embodiment shown as follows according to the invention will be disclosed in this specification.

Registers are provided anew for setting offset values when source addresses and destination addresses are updated respectively so that a series of groups of data may be updated by offsetting addresses, i.e. addresses can be alternately transferred to different regions. By so doing, processing such as the rotation of graphics on the screen of a CRT display, which had conventionally been effected with an aid of software, can be performed automatically by merely changing the data transfer system to thereby enhance the function of the controller along with relieving the burden imposed upon the microprocessor, as a result of which the data throughput obtained throughout the system can be improved.

EMBODIMENT

Figure 1:
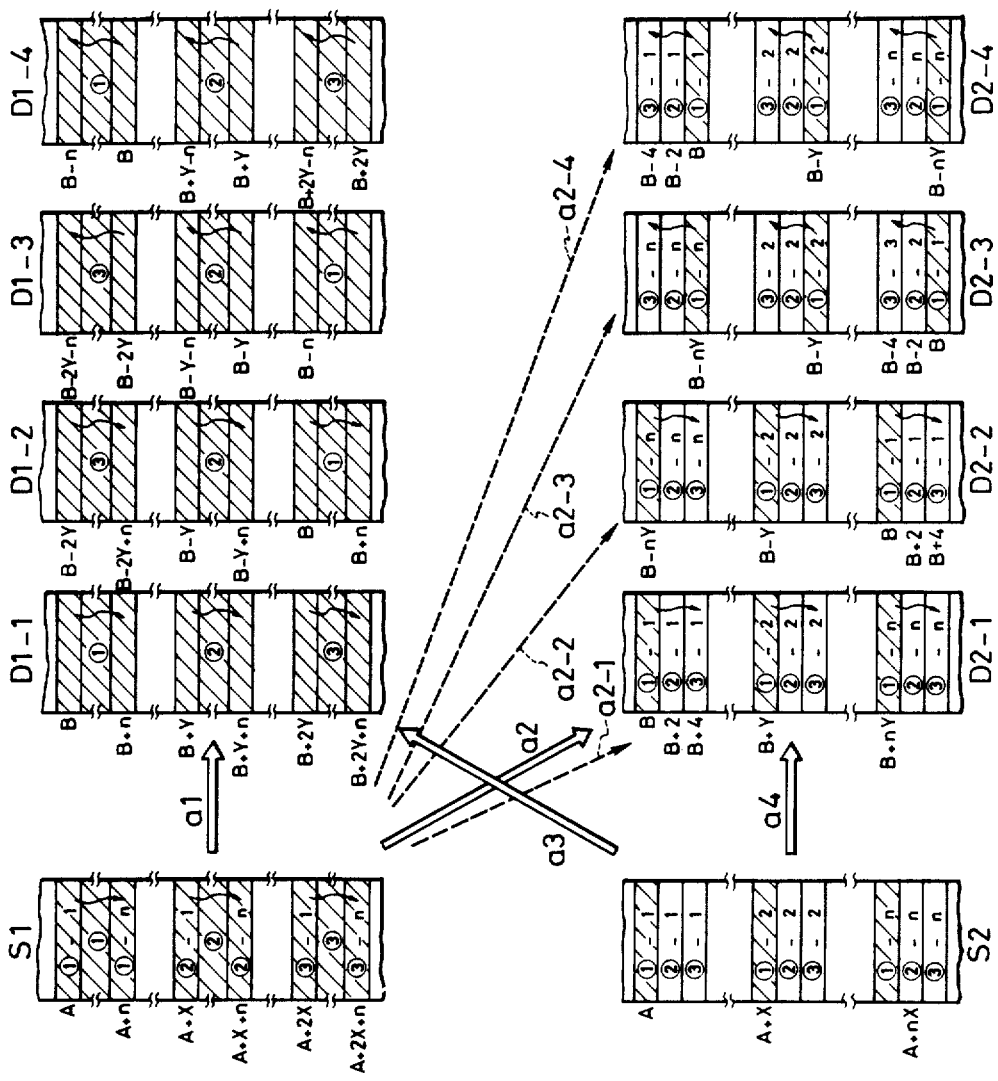
FIG. 1 shows an explanatory view illustrating the principle of the offset data transfer system according to the invention.

First, the principle of the offset data transfer system will be described according to the invention.

When a series of data (block transfer) were to be transferred continuously by the conventional DMA controller, source addresses were updated one after another in succession. Thus, it was necessary to separately store groups of data ①, ② and ③ (hereinafter referred to as a block) transferred to be within the continuous address areas as shown by the reference numeral S1 in FIG. 1.

Transferred data is stored in the continuous address areas within the memory or the input/output units. In this case, a leading address of each address area wherein the data is stored is chosen arbitrarily. Moreover, the orientation of data storage could be chosen freely so that data might be stored by either increasing or reducing the number of addresses, as a result of which, each block of data could be stored at the destination designated D1-1 to D1-4 of FIG. 1. In other words; according to the conventional data block transfer system, such a data transfer mode was considered to be possible as shown by the arrow a1 of FIG. 1.

In contrast to this, the data transfer system according to the present invention, instead of updating source addresses or destination addresses one after another in succession, updates them alternately with an appropriate offset value respectively (provided that it is a constant value until a block of data is completely transferred). Simultaneously, to achieve the overall aim of the invention, either source addresses are destination addresses or both are updated with the offset values.

Assume in this case, for example, that block data ①, ② and ③ stored in the continuous address areas are transferred as shown by S1 of FIG. 1, with a header destination address taken as B and an increasing offset value as Y. In this case, initial data ①-1 stored within the block ① (provided in this case that each set of data has a word unit such as 16 bits) enters an address B as shown in D2-1 of FIG. 1 and the following data ①-2 an address B+Y. When the transfer of n data is completed like this, the first data ②-1 of the following block enters an address B+2 and the following data ②-2 an address B+Y+2, as a result of which data thus transferred is, stored as shown in D2-1 of FIG. 1.

On the other hand, when data is transferred with a decreasing offset value of the destination address being taken as Y, data is stored as shown in D2-2 of FIG. 1. Furthermore, when the offset data transfer is effected under the same condition as described above by varying the order of transfer of blocks ① to ③ to ③- ②- ①, for example, each block of data is stored as shown in D2-3 and D2-4 of FIG. 1.

In other words, the data transfer is effected as shown by an arrow a2 of FIG. 1.

Further, if destination addresses are updated one by one without resorting to the offset value Y and again if the data is transferred wtih the source address being updated with an offset value X, data ①-1 to ①-n, ②-1 to ②-n and ③-1 to ③-n, which were stored in advance by the source at equal space intervals (i.e. alternately) as shown by S2 of FIG. 1, will come to be stored within the devices at the destination in the contiguous blocks such as in D1-1, D1-2, D1-3 and D1-4.

In other words, according to this method, the data transfer is effected as shown by the arrow a3 of FIG. 1.

Additionally, if both of the source addresses and the destination addresses are updated in transferring data with offset values taken as X and Y respectively, data is transferred as shown by an arrow a4 of FIG. 1.

Moreover, the data transfer system according to the present invention also permits a block of data to be transferred in the conventional way as shown by an arrow a1 by merely setting offset values to zero respectively.

In the above description data was transferred in units of one word (16 bits); however, it is possible, of course, to transfer data in units of one byte (8 bits) or a long word (32 bits) in the same way. The number of words n which is transferred may be varied in each block.

Next, an embodiment of the device which effects data transfer according to the above-mentioned system will be explained as follows.

Figure 2:
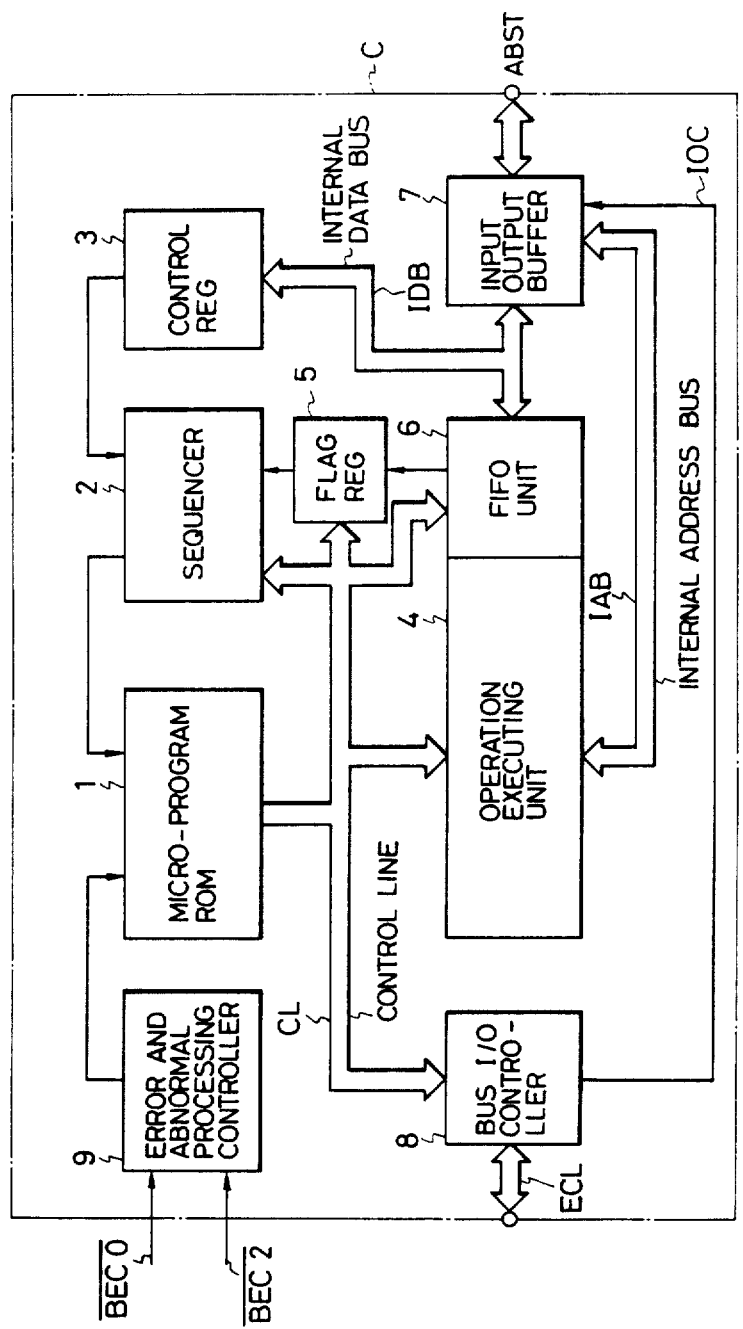
FIG. 2 shows a block diagram an illustrating an embodiment when the concept of the invention is applied to a DMA controller.

FIG. 2 shows a block diagram of an embodiment of the DMA controller according to the present invention.

Although not confined to such an embodiment, each circuit block surrounded by chain lines C in FIG. 2 is formed on a semi-conductor chip such as a monocrystal silicon substrate.

A DMA controller according to this embodiment adopts an interval control system of a microprograming method and within the chip a microprogram ROM (Read Only Memory) 1 is provided in which microprograms are stored.

As will be described later, the above-mentioned microprogram ROM1 includes microprograms which correspond one-to-one to various transfer modes. Each microprogram has an entry address which is unique to that program. If a microprogram address is input to the micorprogram ROM1, the microprogram ROM outputs, to a control signal line CL, control signals for controlling the operation of internal circuits such as a bus input/output circuit 8, an arithmetic unit 4, a FIFO unit 6, a flag register 5 etc. The microprogram ROM 1 also outputs to a sequencer 2 address data indicating the next microprogram address to be run. Although not confined to such an embodiment, the microprogram ROM1 is accessed by 8-bit address data. The next address data output from the microprogram ROM1 is composed of an indication bit which indicates whether the address data indicates a conditional branch, along with following 8 bits or 10 bits. Namely, if the next address is not one showing a conditional branch, the next address data is turned into an 8-bit construction, and in the opposite case, it is composed of 6 bits of address data and 4 bits for determining the branch.

Figure 3:
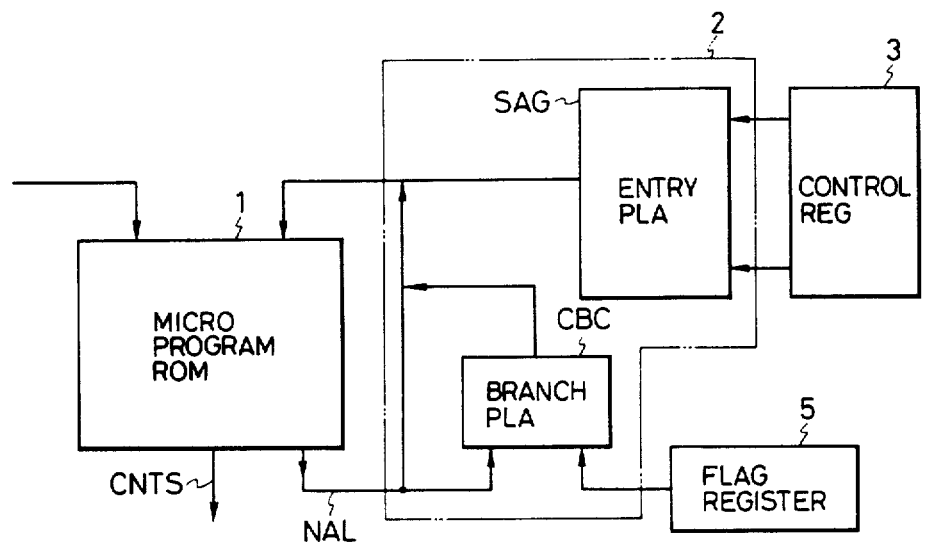
FIG. 3 shows a block diagram of a microprogram sequencer.

As shown in FIG. 3, for example, the microprogram sequencer 2 is comprised with a start address generation section SAG and a conditional branch control section CBC. The start address generation section SAG is composed of a PLA (programmable logic array) so that it may generate address data of the initial microprogram instruction to the above-mentioned microprogram ROM1 on the basis of information concerning the transfer modes which is supplied from a control register section 3.

The conditional branch control section CBC determines the microprogram instruction which is to be executed next on the basis of the arithmetic information from an arithmetic section 4 which will be described later and the status information from the flag register 5. Namely, if the next address data output to an address data line NAL from the microprocessor ROM1 of FIG. 3 is not the one which shows the conditional branch, the data is supplied to the microprogram ROM1 as the next address of the microprogram ROM1. If the next address data output to the address data line NAL is one showing a conditional branch, the next address data which is to be supplied to the microprogram ROM1 is formed in the following way.

Namely, of address data which is output from the address data line NAL, 4-bit control data is supplied to the conditional branch section CBC and the remaining 6-bit address data is supplied to the microprogram ROM1. The conditional branch section CBC outputs 2-bit address data designating one of four addresses to be branched by decoding the 4-bit control data supplied from the microprogram ROM1 and the flag data composed of a plurality of bits output from the flag register. Thus, 6-bit address data output from the microprogram ROM1 and the 2-bit address data output from the conditional branch section CBC are supplied in combination to the microprogram ROM1. A series of microprogram instructions are read out from the microprogram ROM1 through the control of the microprogram sequencer 2 to form internal control signals for feeding it to each block.

As will be described later with reference to FIG. 5, the control register section 3 includes an operation control register OCR, a sequence control register SCR, a table access control register TCR and an offset control register OFFCR.

As will be described later with reference to FIG. 5, an arithmetic executing unit 4 includes therein a variety of registers such as a memory address register MAR, a device address register DAR, a base address register BAR, a memory-side offset value setting register MOFF, a device-side offset value setting register DOFF, various registers such as a register GRA for storing the header address of the source block, a register GRB for storing the header address of destination block and a register GTC for storing words transferred (GTC), counters such as a memory transfer counter MTC, a base transfer counter BTC etc. and an ALU (arithmetic logic unit). The arithmetic executing unit 4 computes addresses necessary for DMA transfer and the number of words transferred in accordance with the control signals supplied from the above-mentioned microprogram ROM1.

Figure 4:
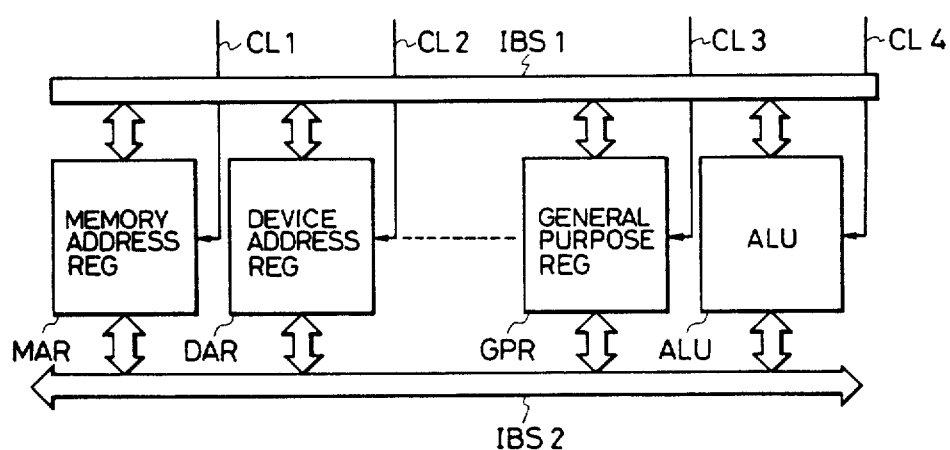
FIG. 4 shows a block diagram of an arithmetic executing section.

Namely, as shown in FIG. 4, for example, the arithmetic executing section 4 includes internal buses IBS1 and IBS2 and various registers as mentioned above and general purpose registers GPR and ALU. The internal bus IBS2 is connected via a coupling circuit (not shown), for example, to buses IDB and IAB as shown in FIG. 2. According to this arrangement, data within a memory address register MAR, for example, is updated as follows.

Offset data stored within the offset value setting register MOFF in memory, as will be described later, is supplied to the ALU via the internal bus IBS1 and the address data stored within the memory address register MAR is supplied to the ALU, which will update them, depending on the offset data. Updated data is written again into the memory address register MAR via the internal bus IBS1.

Address data computed is output to external address buses via an input/output buffer circuit 7 and a group of external terminals ABST. A FIFO unit 7 is provided within the arithmetic section 4. The FIFO unit 6 is used not only for keeping temporarily transferred data read into the interior of the chip via the input/output buffer circuit 7 but also for administering the partition and the integration thereof.

For example, data divided into two which is supplied from an external source by the multiplex system is input sequentially into two areas within the FIFO unit 6 and is then output simultaneously from said two areas with the result that the FIFO Unit is actuated essentially as a series-parallel conversion circuit. If, conversely, data signals are to be output in the multiplex mode, data is input separately into two areas with a FIFO unit before they are sequentially output to an external destination from these two areas.

A bus I/O control section 8 generates and controls control signals for controlling input/output units which are connected to buses and to external destination in accordance with control signals supplied from the microprogram ROM1. Namely, the bus I/O control section receives DMA transfer demand signals or channel demand signals which are sent out from peripheral devices, for example, via an external control terminal ECL, and generates channel acknowledge signals or the peripheral control signals which acknowledge that the demand was accepted by peripheral devices of which the data transfer is requested. Moreover, signals for controlling the operation of the input/output buffer 7, i.e. control signals for indicating whether the input/output buffer 7 shall be operated as an input buffer or as an output buffer are output to a control line IOC on the basis of control signals sent out from the microprogram ROM1 and transfer demand signals sent out from peripheral units.

Although the invention is not confined particularly to such an embodiment, the DMA controller according to this embodiment includes four independent channels so that input/output units connected to each of said channels may be controlled independently.

Furthermore, the DMA controller according to this embodiment is provided with an error control and extraordinary processing control section 9 which not only detects various errors such as bus errors and count errors but also performs various types of special processing such as error recovery and interrupts.

The extraordinary processing control section 9 is operated by coded exceptional processing demand signals which are formed by an encoder (not shown) provided externally. These signals are sent out to a processing section 9 via external terminals $\overline{BEC0}$ to $\overline{BEC2}$. By decoding exceptional processing demand signals, the extraordinary processing control section 9 outputs, to the microprogram ROM1, address data which indicates the header address of the microprogram intended for the exceptional processing. When address data is output from the extraordinary processing section 9, the address data is masked which is sent out from the program sequence 2 to the microprogram ROM1 so that the extraordinary processing program may be run.

Figure 5:
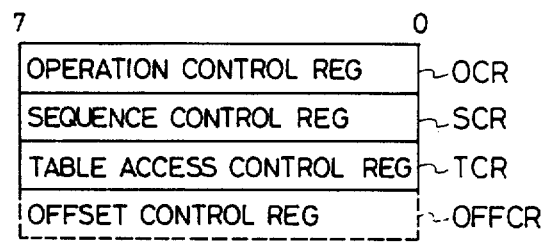
FIG. 5 shows an explanatory view illustrating an arrangement of the internal main registers.
Figure 5:
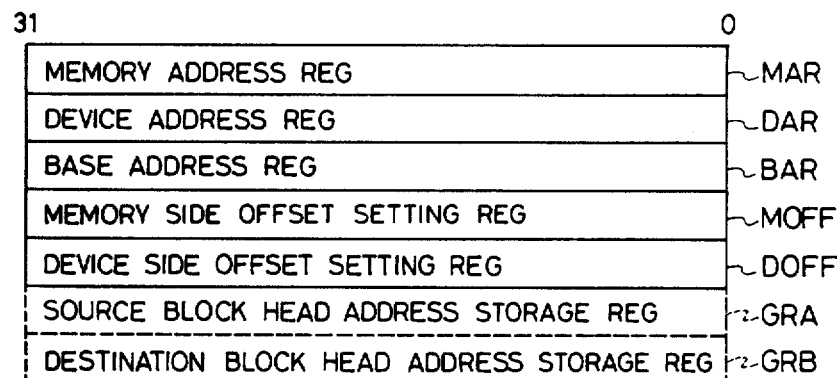
Figure 5:
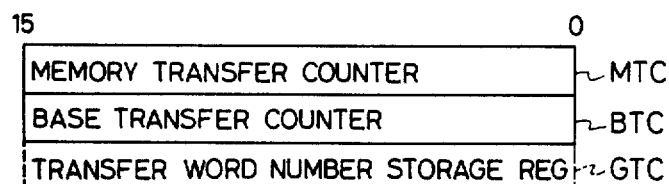

FIG. 5 shows registers associated with offset data transfer according to the invention, which is one of registers provided within the DMA controller. These registers are provided one after another, in succession, corresponding respectively to each of four channels provided within the DMA controller. Of these registers GRA, GRB and GTC which are surrounded by broken lines are used for internal tasks for the purpose of address computation, which shows the need for access by the MPU. Therefore, although the invention is not necessarily restricted to such a construction, they are constructed in such a way that their internal conditions cannot be seen from outside of the chip.

Besides, registers MOFF, DOFF, GRA, GRB, GTC, TCR and OFFCR, as seen in FIG. 5, are one added anew when the invention is to be implemented. The remaining registers are identical with those already used in the DMA controller such as the series HD684 50 manufactured by Hitachi Manufacturing.

Of the registers shown in FIG. 5, an operation control register OCR, as seen from the following table, includes bits DIR for indicating the direction of data to be transferred, bits SIZE for indicating the size of transferred data i.e. the number of bits and bits CHAIN for indicating the sort of transfer modes such as an array chain transfer, a link array chain etc. and bits REQG for designating the sort of the transfer demands such as a external transfer demand or an automatic transfer demand; for setting the transfer operation mode DMA controller.

TABLE 1

| 7 | 6 | 5 | 4 | 3 | 2 | 1 | 0 |
|---|---|---|---|---|---|---|---|
| DIR | | SIZE | | CHAIN | | REQG | |

Although the invention is not necessarily restricted to such an embodiment, "0" in bit DIR implies a data transfer from the memory to the device or a data transfer from the address designated by the memory address register MAR to the address designated by the device address register DAR and "1" indicates an inversed data transfer. Bits "00", "01" and "10", located within the bits SIZE, show the data size such as a byte (8 bits), a word (16 bits), a long word (32 bits) etc. "00", "10" and "11" located within bits CHAIN show a non-chain operation, an array chaining and a link array chaining respectively.

The sequence control register SCR includes control bits for individually setting the method for updating the source address and the destination address, which makes it possible to set three updating methods—updating from a smaller memory address to a larger memory, vice versa and no-updating.

Within the memory transfer counter MTC the number of data transfered is set and is counted up or counted down in accordance with the updating method specified by the above-mentioned sequence control register SCR.

A base transfer counter BTC sets and counts the number of blocks of transferred data when they are transferred according to the array mode etc.

Within the memory address register MAR and the device address register DAR the transfer addresses of memory and of peripheral LSIs are stored respectively. Whether this address data stored within registers MAR and DAR indicates the source or the destination is defined by the DIR bits (see Table 1) which designate the direction of transfer stored within the above-mentioned operation control register OCR. Contents of these registers MAR and DAR are replaced one after another by addresses which are updated. Within the base address register BAR there is stored addresses of a memory in which a table referred to by the DMA controller is stored when the array chain transfer and the link array chain transfer are executed.

Within registers MOFF and DOFF to be provided anew according to the present embodiment, there are set offset values of transfer addresses in memory and devices respectively. Offset values for these offset registers MOFF and DOFF are added to or subtracted from addresses set within the memory address register MAR and device address register by the ALU, etc. to thereby update the address by the offset value. The addition or the subtraction of offset values is instructed by the below-mentioned offset control register OFFCR.

Registers GRA and GRB store header addresses of the source block and of the destination block respectively. Even if address data stored within said memory address reigster MAR and device address register DAR are updated as the data is transferred, each header address stored initially is stored within these registers GRA and GRB during the time, for example, when the transfer of a block of data is not complete. Namely, when data is transferred as shown in S2 of FIG. 1, the content of the header address setting register GRA at the source is held at the previous value until the transfer of a block of data ①-1 to ①-n is completed and is updated to the header address of a block (address of data ②-1) prior to the following block of data ②-1 to ②-n being transferred. With these registers GRA and GRB, the computation of address required can rapidly be effected even if the transferred block is changed during the transfer of below-mentioned offset data. Namely, when header address data for the source addresses and the destination addresses are stored within the external memory, the DMA controller must make reference to the external memory for address computation.

In contrast, when, as shown in the embodiment, registers GRA and GRB are provided within the DMA controller, address computation is possible with the microprogram, as a result of which high speed operation can be realized.

The register GTC stores the number of words transferred, which was set initially within the memory transfer counter MTC. Even if the content of the memory transfer counter MTC is decremented or incremented with the data transfer, the initial data concerning the number of transferred words can be stored within the register GTC so that address computation can be facilitated when the offset data is transferred.

Moreover, within the register TCR, there is stored the data which must be referenced when in the array chain transfer mode or the link array chain mode. This register TCR is composed of bits as shown, for example, in the following Table 2.

TABLE 2

| number of bit | 7 | 6 | 5 | 4 | 3 | 2 | 1 | 0 |
|---|---|---|---|---|---|---|---|---|
| bit definition | MAR | MOFF | DAR | DOFF | MIC | O | O | BAR |

If in Table 2 a digit "1" is set at the outset within each bit, that means that corresponding registers MAR, MOFF, DAR, DOFF, MTC and BAR are accessed.

Furthermore, during a reset operation this table access control register TCR is set to "10001001". In other words, a digit "1" is set in advance in the bit which corresponds to the register used in common in each transfer mode, provided that in the array chain transfer mode the bit BAR is judged to be "0".

The offset control register OFFCR stores the data which shall be referred to during the transfer of offset data. This register OFFCR is composed of bits as shown, for example, in the following Table 3.

TABLE 3

| number of bit | 7 | 6 | 5 | 4 | 3 | 2 | 1 | 0 |
|---|---|---|---|---|---|---|---|---|
| bit definition | MOFF | | DOFF | | MOC | DOC | O | BAR |

In this case, when bits MOFF and DOFF are "0, 0", "1, 0" and "1, 1" respectively, they designate respectively a mode for the memory side address and the device side address in which the offset value is not used, a mode in which it is used for each transfer within blocks and a mode in which it is used for switching blocks, provided that "0, 1" is not defined yet.

Bits MOC and DOC stored within the offset control register OFFCR are data for instructing to add or subtract the offset value respectively to or from the memory addresses and device addresses. Although the invention is not necessarily restricted to such an example, a digit "1" implies the addition of the offset value and "1" the subtraction thereof.

Besides, within the DMA controller, there is provided not only the aforementioned registers but also registers for indicating the condition of the DMA controller, registers for setting the control mode associated with input/output units, registers for setting channel priority, a variety of registers as provided within the DMA controller HD 68450 manufactured by Hitachi Manufacturing Inc. etc.

In the above-mentioned embodiment, registers GRA and GRB for storing header addresses of blocks at the source and the destination and a register GTC for storing the number of transferred words are provided further within the arithmetic operation section 4 in order to ease the computation of transferred addresses, although these ones can be omitted while achieving the same purpose.

When the DMA controller as shown in FIG. 2 is used as a part of a microcomputer system, a group of external terminals ABST are connected to a system data bus and a system address bus (not shown) via a bus interface circuit (not shown) including a signal switching circuit. The MPU is connected to a system data bus and a system address bus, to which in turn are connected input/output devices such as a memory and disc controller etc. The external control channel ECL is connected to a control terminal of each input/output device as well as to a control terminal of the MPU. The external terminals $\overline{BECO}$ to $\overline{BECZ}$ used for the extraordinary processing control section 9 are connected to the output of the control circuit as composed of encoders which receive extraordinary processing demand signals or extraordinary indicating signals sent out from the input/output devices and the MPU.

Figure 6:
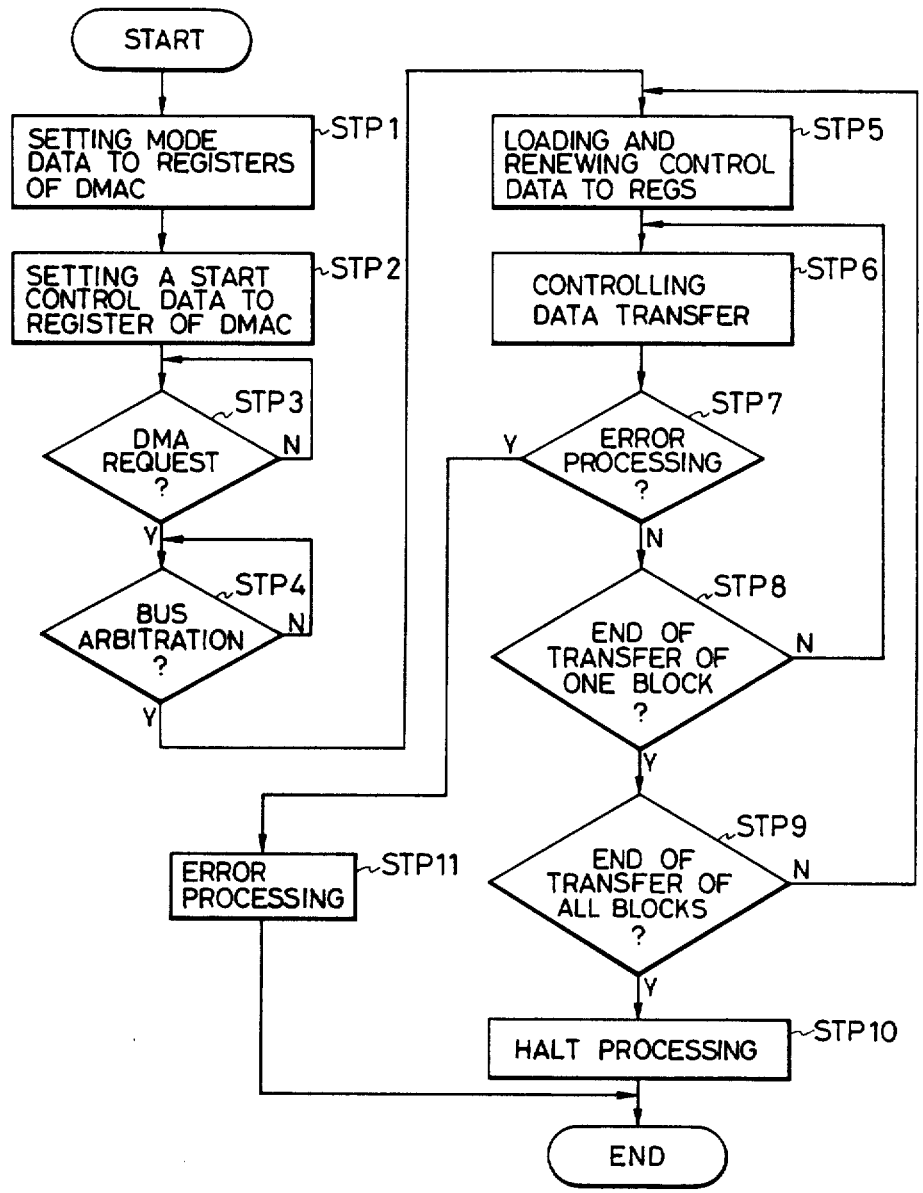
FIG. 6 shows a program flow chart illustrating the operation of a DMA controller.

FIG. 6 shows a program flow chart illustrating the basic operation of the DMA controller according to the embodiment.

In a program step STP1, the DMA controller is selected by the MPU, by which the control data such as data transfer direction indicating data DIR, size data SIZE, chaining data CHIN etc. as mentioned above are written into its internal register e.g. operation control register OCR. In the program step STP1 it depends on the transfer mode required what sort of data should be written into other registers.

In the control operation of the DMA controller, as will be explained later, in which the table of transferred information is not used, the header address data of the memory and device, offset data etc. are written by the MPU into registers MAR, PAR, MOFF, DOFF etc.

In the control operation in which the table on the transferred information is used, the address of the memory in which data constituting the table of transferred information is written is written by the MPU into the base address register BAR within the DMA controller.

With reference to a program step STP2, data which shows the completion of presetting of control data is written by the MPU into a register such as a condition control register within the DMA controller so that the DMA controller can be put to the condition in which it can perform the control operation.

In a program step STP3, the DMA controller supervises DMA demand signals sent out from the input/output device to the external control terminal ECL. If no DMA demand signals are sent out thereto, the supervisory condition is maintained. If DMA demand signals are emitted from an input/output device, the program step STP4 is run.

In the program step STP4, a BUS demand is delivered by the DMA controller to the MPU through the external control line ECL. When a signal granting use of the BUS is delivered by the MPU to the DMA controller in response to the BUS demand, a right for exclusive use of the BUS is given to the DMA controller. Using this right, the DMA executes the following program step STP5.

In a program step STP5, the DMA controller sets data required to registers therein. For example, when the table on the transferred information is used as described above, the memory address indicated by the base address register BAR is referred to and the data stored within the memory address is written into memory address registers MAR, data address registers DAR, etc.

In a program step STP5, after data has been set to various registers, a program step STP6 is run.

In the program step 6, data is transferred between input/output devices or between an input/output device and a memory on the basis of data which was set to said various registers. The step STP6 includes a program for updating address data for the memory address register MAR and the device address register DAR by offset data stored within offset registers MOFF and DOFF.

Subsequent to the step STP6, the program proceeds to a program step STP7 for judging extraordinary processing. If, in the step STP7, extraordinary processing is judged not to be required, i.e. if no signals detecting the extraordinary operation are sent out to the control input channel $\overline{EBC0}$ to $\overline{EBC2}$ shown in FIG. 2, the program proceeds to a step STP8 where the completion of blocked data transfer is decided. For example, the completion of transfer of blocked data ①-1 to ①-n is decided in the case S1 or S2 shown in FIG. 1. If the transfer of blocked data is not completed, the step STP6 is run again. Namely, data is transferred to the memory address and the device address which were updated by the previous step STP6 being run.

If, in the step STP8, the completion of a block of data is detected, the program will proceed to a step STP9 where the completion of the entire block data is decided. If the entire block data is not completely transferred, the program is restored to the step STP5 where address data which shows the header address of the block to be transferred next is set to the memory address register MAR, the device address register DAR etc.

If, in the step STP9, the completion of transfer of the entire block data was detected, the program will proceed to a step STP10 where flags are set to a flag register 5 to indicate the completion of data transfer.

If, in the step STP7, extraordinary processing was decided to be required i.e. if error signals as indicate bus errors had been sent out to control input channels $\overline{EBC0}$ to $\overline{EBC2}$, the program will proceed to a step STP11 where error processing is effected. In other words, as described above, the microprogram address output from a extraordinary processing control section 9 is supplied to the microprogram ROM1 instead of the microprogram address output from the program sequencer 2.

Subsequently, the data transfer operation according to the DMA controller of above-mentioned embodiment will be explained. According to the construction of this embodiment transfer modes composed of three stages can be established as follows.

One of the stages relates to the one with no table on the transferred information in which all of registers MAR, DAR, MOFF, DOFF, MTC, BTC, as shown in FIG. 5 are set to the appropriate values with the aid of the MPU software before initiating the DMA transfer. In this case, no memory table is needed for reference by the DMA controller. Therefore, in this case, there is no need for data to be set into the base address register BAR. In this case, since the DMA controller need not make reference to the table stored within the memory, the time required for reading the transferred information can be saved. Consequently, when offset values at the side of the memory device and the number of words transferred n are constant between blocks, the block transfer can be effected relatively efficiently since with every block transfer the header addresses A and B in the memory and the device respectively may be set.

However, when offset values X and Y at the side of the memory and the device and the number of words transferred n are changed with each block, the burden imposed on the MPU will be increased if each condition of registers MAR, DAR, MOFF, DOFF, MTC, BTC are all set with every block transferred by the MPU.

Figure 7A:
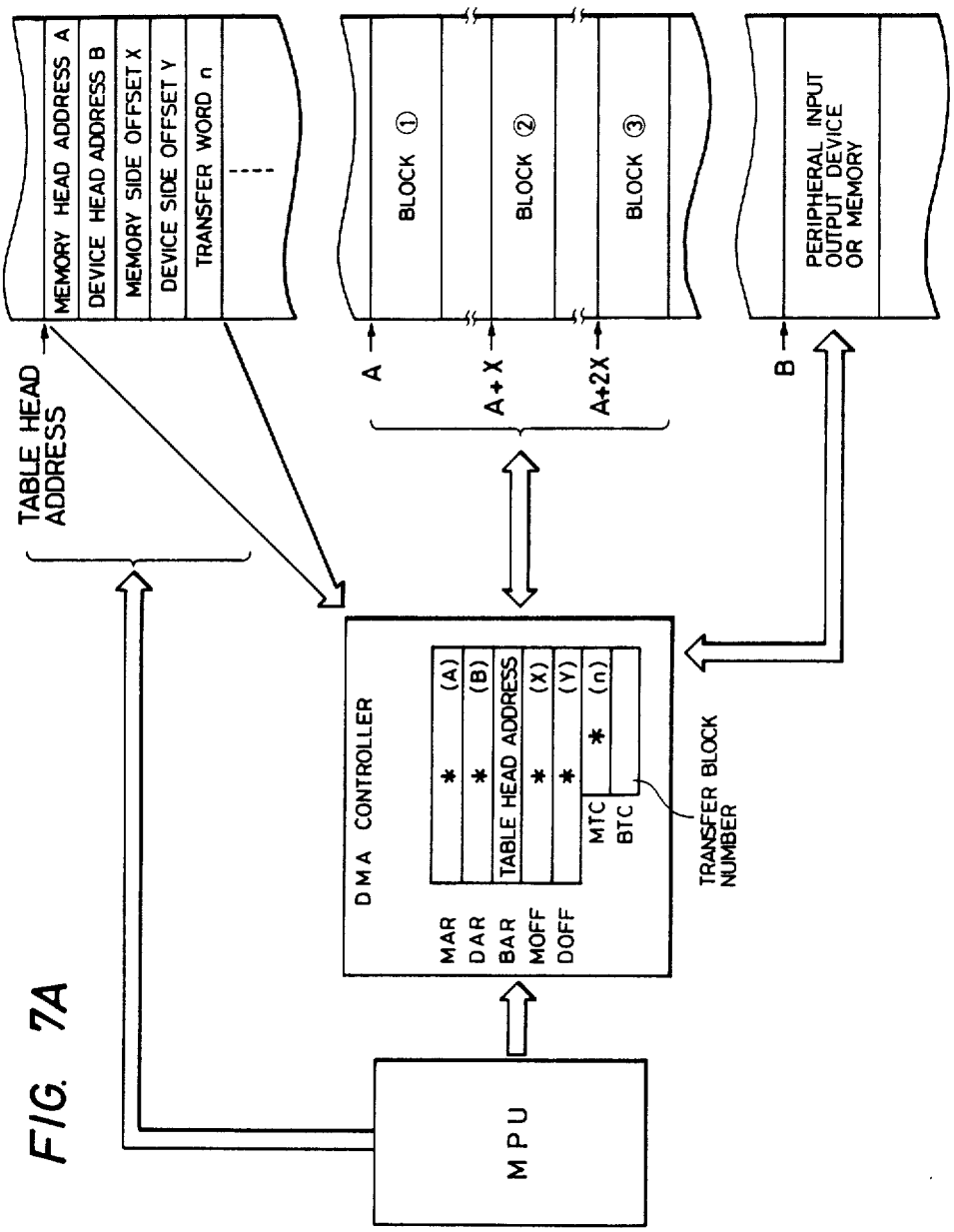
FIGS. 7A and 7B show explanatory views schematically illustrating transfer modes respectively according to the controller embodying the present invention.
Figure 7B:
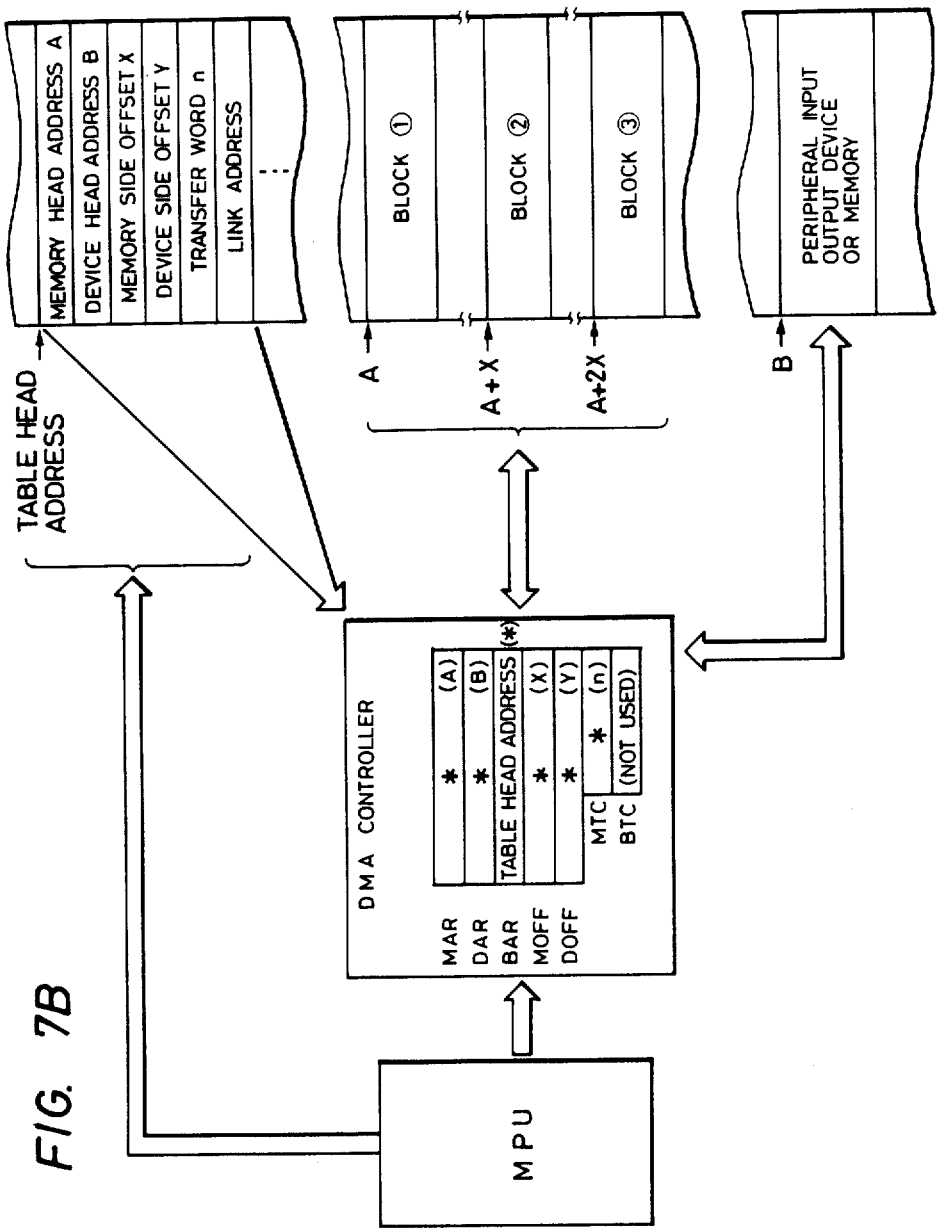

Therefore, in such a case, efficient data transfer is achieved by adopting two other transfer modes as shown in FIG. 7A and 7B to tabulate the information transferred.

FIG. 7A shows schematically an array chain transfer mode and FIG. 7B a link array chain transfer mode.

First, according to the array chain transfer mode, the memory header address A, the device header address B, the memory side offset value X, the device side offset value Y and the number of words n transferred are tabulated to store them within the appropriate areas of the memory. Then header addresses and the number of blocks transferred in this table are set to registers BAR and BTC by the MPU. Prior to initiating the transfer of blocks, the DMA controller refers first to the tabulated data having its address set to the register BAR, which is stored within the memory and makes each of the registers with asterisks read header addresses A and B of the first blocks and offset values X and Y and the number of words transferred n before initiating the transfer of blocks. When one block has been transferred completely, the register BAR is updated and the following information on transferred blocks (A, B, X, Y, n) is read into the corresponding registers while the counter BTC containing the number of blocks transferred is decremented by one. Thus blocks continue to be transferred one after another until the value of the counter BTC becomes zero.

Further, according to the link array chain mode as shown in FIG. 7B, the link address is also tabularly stored within the memory to indicate the address in which the information on the blocks to be transferred next is stored, in addition to the information A, B, X, Y, n in the above-mentioned array chain mode. In this case, however, since the number of blocks transferred is not required, only the header address of the table may be set to the register BAR by the MPU.

In this case, the DMA controller makes first registers with asterisks read the information about the first block (including the link address) by referring to the table before initiating the transfer of blocks. When one block is completely transferred, the information about the following block is read into the DMA controller from the memory address designated by the line address to correspondingly continue to transfer data. And when the link address data which is read out is made zero after the final block is completely transferred, the entire transfer operation is completed correspondingly. Further, link addresses are taken one after another into the register BAR to which the header address of the table is set initially.

According to the array chain transfer mode as shown in FIG. 7A, since the array table shall be stored in the continuous memory addresses when blocks to be transferred are cancelled, it is required for repacking the table to move up successively data of the whole blocks following blocks to be cancelled. When blocks are to be added, it is also necessary to offset the data stored in the table to insert data. In contrast, in the case of the link array chain transfer mode, it is easy to add or cancel blocks by merely rewriting the link address.

Further, in the transfer mode as shown in Fig. 7A and 7B, only a part of the information transferred (loading memory address A and the number of words transferred or these and link address) may be tabulated while the other information (header device address B, header table address and offset values X and Y) may be set by the MPU so that the time required for reading out the information transferred can be shortened.

The above-mentioned functions may be achieved easily by designating the registers which read the information transferred by the above-mentioned table access control register TCR.

According to the above-described embodiment, a block transfer system identical with the prior ones with no offset values may be achieved without the use of memory offset register MOFF, device offset register DOFF etc. or by setting zero to these registers.

All the data transfer systems as shown in arrows a1 to a4 of FIG. 1 may be realized to improve the control function of the DMA controller by effecting the offset data transfer with the help of the DMA controller as constructed above.

Next, concrete examples of offset data transfer will be explained.

Figure 8:
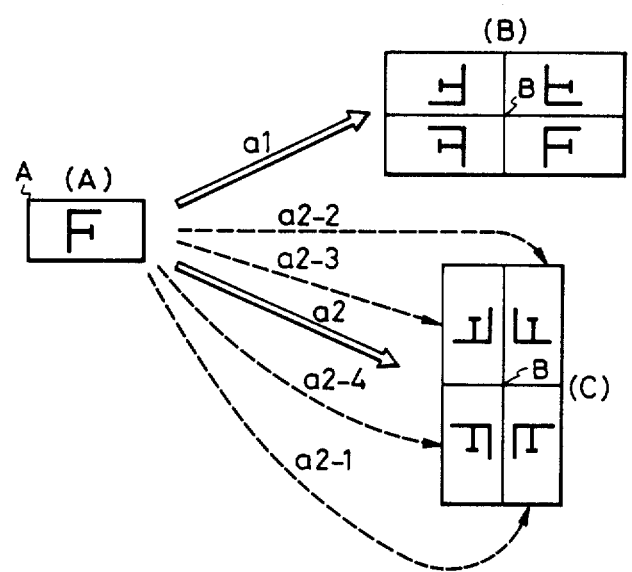
FIG. 8 shows an explanatory view illustrating the application of the offset data transfer system to the image display according to the invention.

Assume, for example, that in a microcomputer system having a graphic processing function data displaying the graphics as shown in FIG. 8 (A) on the screen (reference point A) of CRT display is stored in memory (refresh memory) (In this case F is displayed by way of example.). In this case, if the block transfer is effected as shown by the arrow a1 of FIG. 1 within the refresh memory by the conventional system, four kinds of reversed graphics can be obtained at other positions (reference point B) on the screen as shown in FIG. 8 (B). However, according to the conventional block transfer system, a data transfer was not possible for display of the laterally faced graphics which were rotated by 90°, as shown in FIG. 8 (C).

In contrast, if the offset data transfer system is used according to the invention, the writing of image data which displays graphics as shown in FIG. 8 (C) can be achieved automatically by effecting the transfer within the refresh memory as shown in FIG. 1 by arrows a2-1, a2-3 and a2-4. Accordingly, the conversion of image data which had been performed by the MPU with the aid of software or by the CRT controller can be effected extremely easily by the DMA controller, thereby improving the data throughput throughout the system as well as increasing the image display speed.

Likewise, by applying the principle according to the invention to printers, it may be eased to convert letters written laterally to ones written vertically and vice versa by converting letters data by 90° through data transfer when the information stored within the memory is printed out.

Following advantages can be obtained according to the invention.

Since registers are further provided for setting offset values for the source address and for the destination address, a rotational processing of graphics on the screen of CRT display, which had been performed conventionally by the software, may be automatically achieved simply by changing the data transfer system by updating a series of data groups with addresses being offset i.e. by transferring addresses alternately so that the function of the DMA controller can be improved greatly and the burden imposed upon the microprocessor can be reduced to increase the throughput throughout the system.

As described above, the present invention was explained concretely with reference to the embodiment, but the invention is not limited to the above-mentioned embodiment and various modifications and changes could of course be made without departing from the spirit of the invention. For example, although in the above-mentioned embodiment control registers TCR and OFFCR provided anew include bits as shown in Tables 2 and 3, the arrangement of bits for each register is not limited to that one, and various modifications and changes could be conceived easily. Additionally, the arrangement of blocks stored within the DMA controller is also not confined to the one as shown in FIG. 2.

Although in the above description the invention was explained with reference to the DMA controller for controlling the transfer of data in the field of microcomputer system, it is not confined to that field but can be utilized generally to the data processing system such as in the field of data base or file processing.

What is claimed is:

1. A data transfer control device whose operation is controlled by a microprocessor, comprising:
   a plurality of registers into which source address data, destination address data, first offset data and second offset data are set; and
   controller means for performing a control operation for transferring data stored within a storage location indicated by a device address designated by said source address data into a storage location indicated by a device address designated by said destination address data, an arithmetic operation for updating said source address data using an offset value designated by said first offset data and an arithmetic operation for updating said destination address data using an offset value designated by said second offset data.

2. A data transfer control equipment according to claim 1 wherein said controller includes a microprogram ROM in which a microprogram is stored; a program sequencer for outputting program address data to be supplied to said microprogram ROM on the basis of program address data output from said microprogram ROM and an arithmetic unit whose operation is controlled by control signals output from said microprogram ROM.

3. A data transfer control equipment according to claim 2 wherein a plurality of said registers are provided within said arithmetic unit.

4. A data transfer control equipment according to claim 3 further comprising:
   a register provided within said arithmetic unit for storing address data which designates a header address of a group of storage locations of the source data to be transferred; and
   a register provided within said arithmetic unit for storing address data which designates a header address of one of the destination addresses of storage locations into which data is to be transferred.

5. A data transfer control equipment according to claim 3 further comprising;
   a register provided within said arithmetic unit for an amount of data to be transferred being set therein.

6. A data transfer control equipment according to claim 2 further comprising;
   a control register and;
   said program sequencer comprising a start address issuing section for outputting a start address to be supplied to said microprogram ROM in response to the control data supplied from said control register and a conditional branch control section for outputting the address data to be supplied to said microprogram ROM on the basis of a next address data and a flag data output from said microprogram ROM.

7. A method of controlling data transfer in a microcomputer system having a microprocessor, first memory means for holding data, second memory means for holding data and a memory access controller having a plurality of registers, comprising the steps of:
   (a) storing source address data in a first register;
   (b) storing destination address data in a second register;
   (c) storing first offset data in a third register;
   (d) transferring data from a first region in said first memory means designated by said source address data in said first register into a second region in said second memory means designated by said destination address data in said second register;
   (e) updating said source address data using an offset value designated by said first offset data in said third register; and
   (f) transferring data from a third region in said first memory means designated by the source address data updated in step (e) into a fourth region in said second memory means which is located therein adjacent said second region.

8. A method according to claim 7, wherein said first memory means includes a fifth region located between said first region and said third region.

9. A method according to claim 7, further comprising the steps of:
   (c') storing second offset data in a fourth register; and following step (f):
   (g) updating said destination address data using an offset value designated by said second offset data in said fourth register; and
   (h) transferring data from a fifth region in said first memory means located between said first and third regions to a sixth region in said second memory means which follows said fourth region therein and is designated by the destination address data updated in step (g).

10. A method of controlling data transfer in a microcomputer system having a microprocessor, first memory means for holding data, second memory means for holding data and a memory access controller having a plurality of registers, comprising the steps of:
   (a) storing source address data in a first register;
   (b) storing destination address data in a second register;
   (c) storing first offset data in a third register;
   (d) transferring data from a first region in said first memory means designated by said source address data in said first register into a second region in said second memory means designated by said destination address data in said second register;
   (e) updating said destination address data using an offset value designated by said first offset data in said third register; and
   (f) transferring data from a third region in said first memory means located therein adjacent said first region into a fourth region in said second memory means designated by the destination address updated in step (e).

11. A method according to claim 10, wherein said second memory means includes a fifth region located between said second region and said fourth region.

12. A method according to claim 10, further comprising the steps of:
   (c') storing second offset data in a fourth register; and following step (f):
   (g) updating said source address data using an offset value designated by said second offset data in said fourth register; and
   (h) transferring data from a fifth region in said first memory means which follows said third region and is designated by the source address data updated in step (g) into a sixth region in said second memory means located between said second and fourth regions therein.

13. A method of controlling data transfer in a microcomputer system having a microprocessor, first memory means for holding data, second memory means for holding data and a memory access controller having a plurality of registers, comprising the steps of:
   (a) storing source address data in a first register;
   (b) storing destination address data in a second register;
   (c) storing first offset data in a third register;
   (d) storing second offset data in a fourth register;
   (e) transferring data from a first region in said first memory means designated by said source address data in said first register into a second region in said second memory means designated by said destination address data in said second register;
   (f) updating said source address data using an offset value designated by said first offset data in said third register;
   (g) updating said destination address data using an offset value designated by said second offset data in said third register;
   (h) transferring data from a third region in said first memory means designated by the source address data updated in step (f) into a fourth region in said second memory means designated by the destination address data updated in step (g).

14. A method according to claim 13, wherein the value of said first offset data is different from the value of said second offset data.

15. A method according to claim 13, wherein said steps (f) through (h) are succesively repeated for transferring data from regions following said third region in said first memory means to regions following said fourth region in said second memory means.

16. A method of controlling the data transfer in a microcomputer system having a microprocessor, first memory means, second memory means, and a memory access controller which has a first register for storing source address data for specifying a first region in said first memory means, a second register for storing destination address data for specifying a second region in said second memory means, a third register for storing offset data, and an operation executing means for updating said source address data or said destination address data, comprising the steps of:
   (a) transferring data stored in said first region into said second region; and
   (b) updating said source address data or said destination address data by an offset value designated by said offset data in said third register.

17. A microcomputer system comprising:
   a microprocessor;
   first memory means;
   second memory means;
   a memory access controller having a first register for storing source address data for specifying regions in said first memory means sequentially, a second register for storing destination address data for specifying regions in said second memory means sequentially, an offset register for storing offset data and an operation executing means for updating said source address data or said destination address data on the basis of said offset data, whereby said memory access controller includes means for transferring data stored in said first memory means into said second memory means according to an offset value designated by said offset data in said third register.

* * * * *